United States Patent
Kowalski et al.

(10) Patent No.: US 9,444,795 B1
(45) Date of Patent: Sep. 13, 2016

(54) ROBOT MITIGATION

(71) Applicant: Amazon Technologies, Inc., Reno, NV (US)

(72) Inventors: Marcin Piotr Kowalski, Cape Town (ZA); Frans Adriaan Lategan, Gauteng (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/040,124

(22) Filed: Sep. 27, 2013

(51) Int. Cl.
*H04L 29/06* (2006.01)

(52) U.S. Cl.
CPC ................... *H04L 63/0428* (2013.01)

(58) Field of Classification Search
CPC .................................... H04L 63/0428
See application file for complete search history.

(56) References Cited

U.S. PATENT DOCUMENTS

| | | | |
|---|---|---|---|
| 6,331,865 B1 * | 12/2001 | Sachs et al. | 715/776 |
| 8,145,718 B1 * | 3/2012 | Kacker et al. | 709/206 |
| 9,021,255 B1 * | 4/2015 | Aharoni | H04L 29/06 713/155 |
| 9,100,183 B2 * | 8/2015 | Movshovitz | |
| 2005/0177866 A1 * | 8/2005 | Kirsch | H04L 63/0428 726/3 |
| 2006/0248336 A1 * | 11/2006 | Bruns et al. | 713/171 |
| 2009/0144546 A1 * | 6/2009 | Jancula | H04L 63/0428 713/168 |
| 2009/0245515 A1 * | 10/2009 | Bond et al. | 380/255 |
| 2010/0325421 A1 * | 12/2010 | Park | H04L 9/32 713/153 |
| 2014/0068269 A1 * | 3/2014 | Zhou | 713/171 |

* cited by examiner

*Primary Examiner* — Shawnchoy Rahman
(74) *Attorney, Agent, or Firm* — Davis Wright Tremaine LLP

(57) ABSTRACT

Computer systems, such as a client and a server operably interconnected via a network, are subject to stress on computational resources due to an abundance of automated-user traffic. To improve resource functionalities and control the resources available to automated-agents, value information of valuable assets is encrypted such that a client must perform an algorithm for calculating a decryption key in order to view the unencrypted content. Wherein the encryption is tuned in such a way that any computational delay caused by the encryption is imperceptible to a human-user and largely perceptible to an automated-agent such that the need to determine if a user is an automated-user or a human-user is irrelevant.

23 Claims, 10 Drawing Sheets

900

Computational Problem Database

Hash Function Problem    931

Receive Value X, M
Do HMAC(Rand, M)
    until HMAC(Rand, M)=X
Use Rand to decrypt Variable Object

Public Key Cryptography Problem    932

Receive Variable Object and Public Key
Factor Public Key to Calculate Private Key
Use Private Key to Decrypt Variable Object

Discrete Log    933

*Receive P, α, β*
*p = prime*
*α ∈ Zp*
*β ∈ Zp*
*Compute $α^{rand}$*
*until $α^{rand} \equiv β(mod\ p)$*

Use Rand to decrypt
Variable Object

FIG. 9

ROBOT MITIGATION

BACKGROUND

The presence of automated-agents on computer networks is becoming common practice for use in conducting repetitive tasks that bombard websites, platforms and system resources. Web scraping, data extraction, indexing and the like are common place techniques for mining information from websites using programs that simulate human-user interaction over a network. A website hosted on server receives traffic or "hits" each time it is accessed by a user, whether that is a human-user or an automated-agent and each webpage associated with the website contains information that is capable of being viewed and used by the human-user and the automated-agent. Servers are increasingly receiving website traffic from these automated-agents, where sometimes upwards of 50-80% of hits are coming from automated-agents. As automated-agent traffic requires central processing unit processing and general use of computing resources in the same way human-user traffic does, resource capacity is increased by each hit received from an automated-agent and bandwidth can be consumed by each additional server hit causing delay and failure for the human-user. Various technical measures and practices exist for excluding or hindering automated-agents from accessing website content by implementing techniques such as blocking an Internet protocol (IP) addresses, disabling web services, blocking automated-agents based on excessive traffic monitoring, attempting to learn automated-agent behavior, implementing reverse Turing test, using Completely Automated Public Turing test to tell Computers and Humans Apart (CAPTCHA) or other human interaction proofs. Conventional techniques, however, are often prone to misapplication, such as by inhibiting legitimate access, thereby causing a poor user experience.

BRIEF DESCRIPTION OF THE DRAWINGS

Various embodiments in accordance with the present disclosure will be described with reference to the drawings, in which:

FIG. 9 is an illustrative example of a computational database in accordance with at least one embodiment.

DETAILED DESCRIPTION

Figure 1:
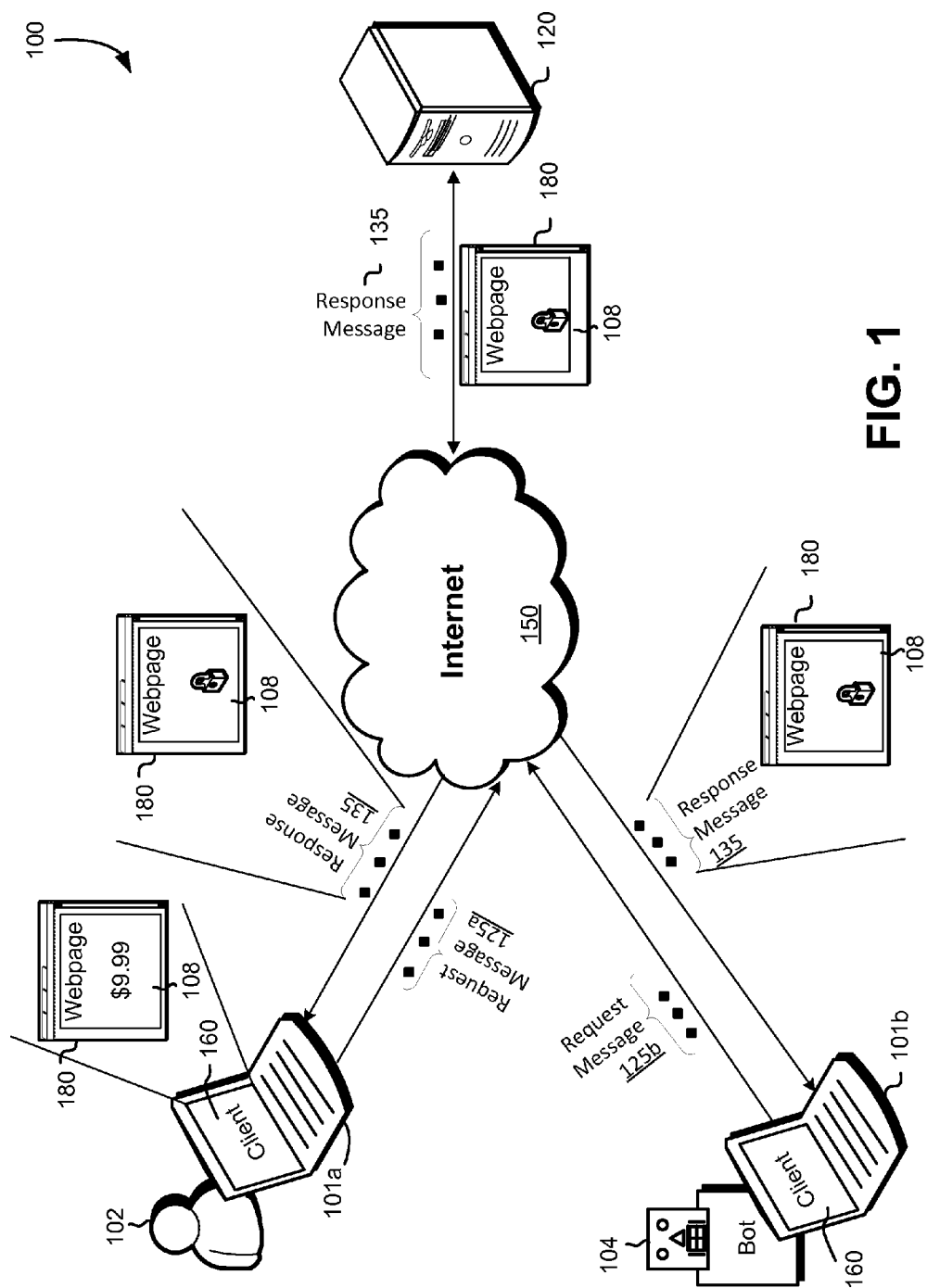
FIG. 1 is an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include robot mitigation efforts to cause an increase in computational resources (e.g., central processing unit (CPU) cycles) required for automated-agents to access content on webpages. Automated-agents, also referred to as automated-users, intelligent agents, robots, scrapers, indexers or bots, generally refer to a computer program configured to accomplish an automated task. Web scraping and indexing techniques can include different levels of automation and sophistication that enable automated-agents to collect content from static and dynamic webpages.

Examples of common web-scraping methods include expression matching, Hypertext Transfer Protocol (HTTP) request posting, retrieving content generated by client-side scripts using Document Object Model (DOM) parsing, data mining, using HyperText Markup Language (HTML) parsers to parse HTML pages, retrieving metadata and the like using semantic annotation recognition, etc.

Imposing limitations on an automated-agent using economics, such as computational economics, makes it such that there is additional cost incurred on the client side to retrieve information from the webpage. Such imposed limitations may be configured to cause additional cost that will be minimal to a human-user accessing the website via a client web browser, as human users will find any delay imperceptible, considerably undetectable or detectible but de minimis (e.g., below some specified threshold considered to be acceptable), whereas an automated-agent will be required to do work to come up with a specific result in order to retrieve the information. Driving such work to the automated-agent increases the computational resources required to gain access to content, and may cause the automated-agent to be dis-incentivized to accessing the website and may direct the automated-agent to interacting with an application programming interface (API) instead of the website.

Example embodiments presented herein disclose methods and systems for driving up the computational costs for an automated-agent to traverse a webpage in efforts to scrape and/or index the webpage content. Where encryption is computationally inexpensive to perform on the server side and decryption is computationally expensive to perform on a client side; where requiring client-side decryption is relatively imperceptible to a human-user of the client and relatively costly for the automated-agent client. An example technique for increasing client-side efforts that impose high computational requirements on automated systems, but only take a short time frame to complete, for example, 20-100 milliseconds, for the human-user is barely, if at all, noticeable. However, for the automated-agent that is coded with the task of cataloging a webpage, every short time frame per catalog item on the webpage will amount to a significant amount of effort and time, such that the automated-agents will be dis-incentivized from continuing to interact directly with the website in order to scrape the content and, generally, will be able to make fewer web page requests per time period due to the additional time required to process each page. The time frames can be shorter or longer than the example above, perhaps by several magnitudes, depending on the state of computational abilities of systems used by robots and/or users.

For the purpose of maintaining values and information related to variable objects on an electronic marketplace, a system providing a website, e.g., a server hosting the website, may be equipped to handle the amount of traffic that comes from not just a human-user, but also an automated-agent that is continuously and constantly accessing the website to index the values and information. Such a mass of traffic causes inefficiencies and failures that are costly on the server. In example embodiments, a server can generate a webpage requested by a client that includes encrypted content, unencrypted content, and executable instructions that, when executed, cause the client to perform an algorithm for calculating a decryption key for the encrypted content and provide that content to the client with the unencrypted content upon proper decryption.

The encryption algorithms can be publically available algorithms that have a high computation rate. For example, the algorithm can be embedded into script that is included with the webpage to be executed to do the actual decryption. In example embodiments, the encryption algorithm may be used as a method of retrieving or calculating a decryption key such that the webpage can be downloaded with the encrypted content and the necessary script, such as JavaScript®, to decrypt the encrypted content as the webpage loads. As this process will be unproductive and costly to an automated-agent, the server can provide the automated-agent with a more efficient method of retrieving content by directing the automated-agent to an application programming interface (API) that can be controlled by the server administrator or owner that will enable better control of hardware resources that can be dedicated to the API to interact with the automated-agents.

In some such example embodiments, the server administrator can provide a web API that is open to automated-agents to a certain extent, for example, a query limit could be placed on the automated-agent, and after the limit is reached, the automated-agent could pay for additional queries. In such example embodiments, the automated-agent would create an account with the API and have access to structured data content, such that the automated-agent would be incentivized to interact directly with the API for efficiency and economic justifications.

Example embodiments can relate to commercial websites that include content related to electronic marketplaces where valuable metrics, such as prices, user reviews, user purchases, availability of products, statistics, user information, and other variables or measures of data and objects available on the electronic marketplace or website with user metrics or valuable information. Alternative example embodiments may include non-commercial websites and databases that include metrics, data, information and the like that are relevant content to be encrypted. The variable objects can include differentiable properties or derivatives of the objects such that the data values or information may be measured or determined as a function of how they change as different properties or inputs relating to that object change. For example, the price of an item or object may vary according to the amount of items available at any given time; if the number of items is consistently decreasing, the price of the item may be varied based on different metrics. For example, a price may be increased if the number of items is decreased, or a price may be decreased as the number of items decreases, depending, for example, on the business metrics associated with the item, buyers and/or sellers. Alternative metrics and/or properties may be used as required or desired.

FIG. 1 is an illustrative example of a simplified block diagram of a communication system 100 of an environment in which various embodiments can be implemented.

In various embodiments, the communication system 100 is illustrated as applications configured on a user device 101a and 101b operably interconnect to a server apparatus 120 via a network, such as the Internet 150. In the instant example embodiment, the user device 101a is configured to run a client 160 for initiating communication with the server 120 via the Internet. The client could also be an automated-agent, such as a bot 104 using a device 101b to interact with the server 120 via the Internet 150.

The server 120 can be implemented in a hardware apparatus, for example, a computer or computer system, and may be implemented as a software application running on the computer or computer system. In alternative example embodiments, one or more clients may be operably interconnected to one or more servers or clusters via a network or intermediary networks and may similarly communicate with other destination devices coupled to the network or intermediary networks.

The user devices 101a and 101b can include a desktop personal computer, workstation, laptop, personal digital assistant (PDA), cell phone, or any Wireless Application Protocol (WAP)-enabled device or any other computing device configured to interface directly or indirectly to the Internet 150. The client 160 may run a network interface application or software application, which can be, for example, a browsing program to enable users to locate and access information provided by a server. Such a server can be a web server where the browsing application is primarily configured for use of the World Wide Web, but could also access information in private networks or files in file systems. The client 160 could also run a WAP-enabled browser executing on a cell phone, PDA, other wireless device or the like. The network interface application can allow a user of client 160 to access, process and view information and documents available to it from servers in the system, such as the server 120.

A human-user 102 and/or an automated-agent 104 can control (e.g., via user input and/or automated instructions) a respective client to send a request message to a server with a request for a specific resource, content, information or the like using HTTP. The request messages 125a and 125b are electronic request messages submitted over the Internet 150 via the respective clients 160 and are provided to the server for processing. The server 120 can be configured to process a request in many ways and respond to the request, for example, by providing the content of the resource or a message disclosing an error or other action if the server will not or is not able to provide to content. For example, 1xx to 5xx response status codes used in HTTP responses to specify one of five classes of response.

The server may respond to the web clients 160 in the same or different manner, or a combination of the two. The server can send a response message 135 to web clients 160, where, in this example, the response messages 135a and 135b include the requested data, such as the webpages 180a and 180b. A user 102 using the user device 101a could, for example, view the webpage 180 and see a variable object 108, such as a price of an item, where the price is listed as $9.99.

Figure 2:
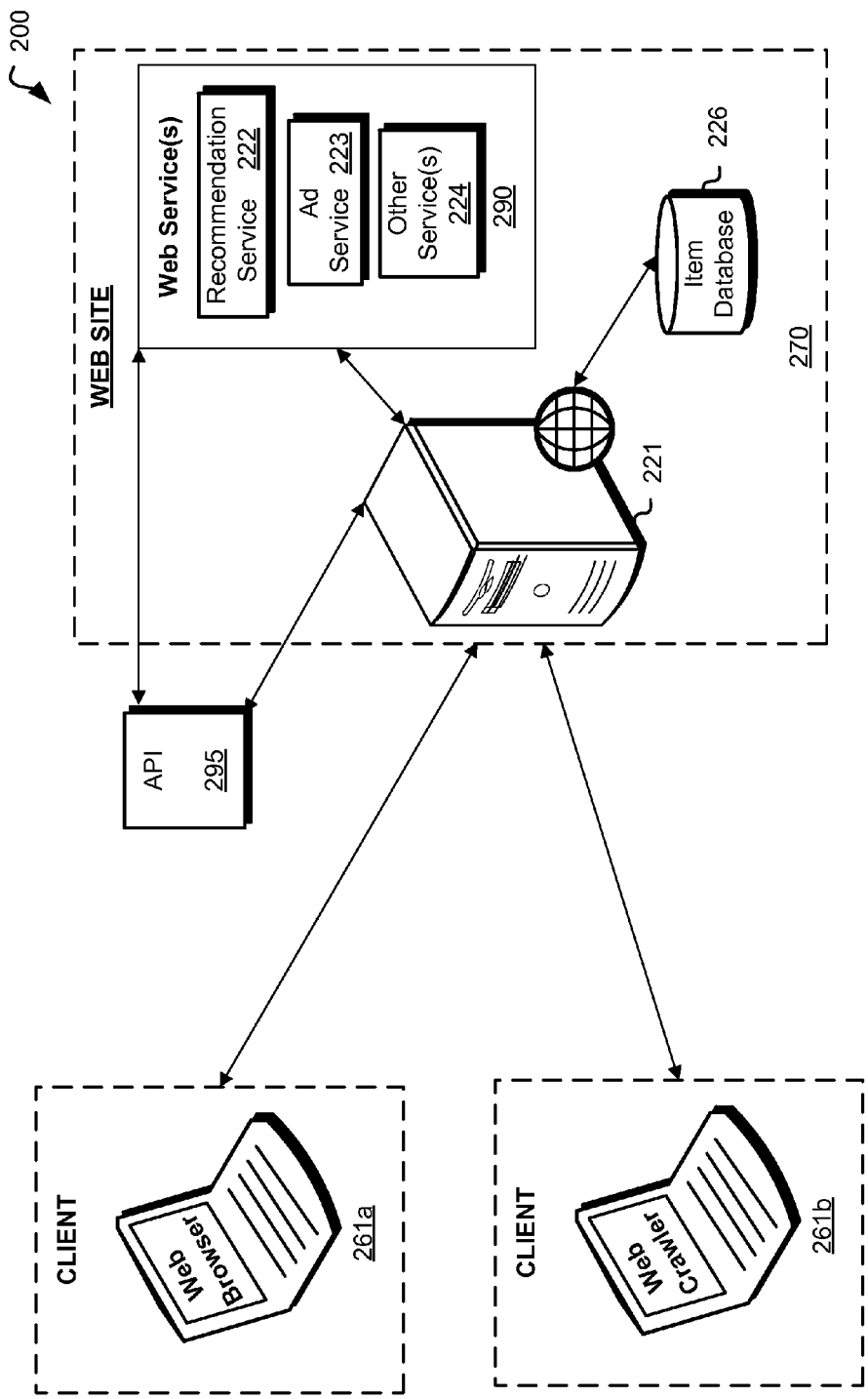
FIG. 2 is an illustrative example of an environment in which various embodiments can be implemented.

FIG. 2 is an illustrative example of an environment 200 in which various embodiments can be implemented. In various embodiments, a web browser 261a or web crawler 261b, such as a computer or software application configured to initiate contact with a server to request a resource or make use of a resource. The web browser 261a or web crawler 261b can be a client, such as the client 160 in FIG. 1. A web server 221 can be a computer or system configured to share a resource or the computer application to help deliver the content being accessed. For example, the web server 221 can be a server, such as the server 120 in FIG. 1, to host a website. Example embodiments may include a website, including a set of documents and/or resources that are available via a common domain.

A computer or computer system can act as both a client and a server at the same or different times and is able to both request and respond to communications. In various embodiments, the web browser 261a or web crawler 261b can be located on a user device, such as a workstation, personal computer, mobile device or other device configured to run a client.

For example, a client being a web browser running on a user-side device may request content from an application running on a server-side device that hosts the content. The client submits a request message to the server and the server returns a response message to the client, where the server's response message is configured to carry information, such as the status of the request, the requested content, and/or additional information, content or action per the communication. Alternative exemplary embodiments may disclose a client being executed on a remote server (e.g., via the Silk browser model).

The web server 221 can use or be operably interconnected with web services 290, such as a recommendation service 222, an advertisement service 223, or other services 224 that may be required or desired services such as a Web Service API. The web server can further communicate or be operably interconnected to an item database 226, which could be a web service, reside on the web server or reside on a separate database server or set of servers. The item database can be configured to store or retrieve data for content included on websites hosted by the web server 221 for providing said content to a client communicating with the web server.

Various embodiments can include the web server also being operably interconnected with an application programming interface (API) 295 that can specify methods for software components to interact with each other. The API enables one application to communicate with at least one remote application over the Internet, or other such private or public network, based on a set of instructions. The API can be located on the same or a different server as the system providing the website 270. The API can include one or more procedural libraries, including, for example, sets of instructions for data structures, classes, routines, variables and other such sets of functions that enable interaction with specific software components or instructions for specific tasks. Example embodiments may enable an automated-agent to circumvent the computational requirements discussed throughout by directing the automated-agent to interact directly with the API. The API can instruct an automated-agent to interact with the server in a specified fashion prescribed by the API specification.

As the automated-agent is running on a network node or computer, the computer's computational resources is at stake when the automated-agent is required to satisfy certain requirements, for example, such as receiving an executable program, execute the program, and return the results. As the computer's central processing unit (CPU) or processor performs these calculations and logic functions, or directs resources to do so, the computer's performance will suffer with respect to the number and difficulty of the computations required. As instructions are executed on the CPU, resources are used; as a finite number of resources are available, additional computation cost that is imposed on the computer will lead to less efficiency and more delay. The extraneous computational work caused to the automated-agent will limit the capabilities of the computer and cause resource problems related to time or clock cycles, bandwidth, hardware space, CPU space, memory space, etc. These limitations will in turn lead to limitations being placed on the automated-agent that halts or delays the automated-agent from excessive scraping/use.

Enabling and/or directing automated-agents to interact directly with an API, allows the API to describe/prescribe the expected behaviors and provide for the actual implementation libraries for such set of rules.

Some such embodiments can allow the server administrator to charge for access to the API. For example, the server could restrict access to the API unless the automated-agent is authenticated, where the authentication can take many forms such as a user name and password or, more commonly used in the presence of automated-agents, a token sent by the automated-agent with the request. Upon receipt of the request and token, the server authenticates the automated-agent and responds to the request.

In situations where an identifier of the client has been recorded as an automated-agent, when the client sends a request to the server, the server can respond in multiple ways one of which is HTTP server code such a redirect code to direct the client to another resource or website such as an API. Other exemplary embodiments allow for the server, in response to a request, to return a different webpage other than the webpage requested that would direct an automated-agent to the API or provide a directive via a meta tag in the header of the HTML document that will provide "hints" or directives to the client.

In the area of APIs related to website development, examples of a web API or web service define request messages and the structure of response messages enabling data and/or content to be shared among applications and the like. A web API may be defined as a set of Hypertext Transfer Protocol (HTTP) request messages and the response message structure can be defined in an Extensible Markup Language (XML) type format, JavaScript® Object Notation (JSON), and/or design paradigms such as Representational State Transfer (REST), while other currently known or hereinafter developed protocols and/or design models relating and/or applicable to the instant invention. Information on an API can be released for general use or such information on the API can be protected or concealed from general use making it application specific, a combination of the two is similarly possible.

Figure 3:
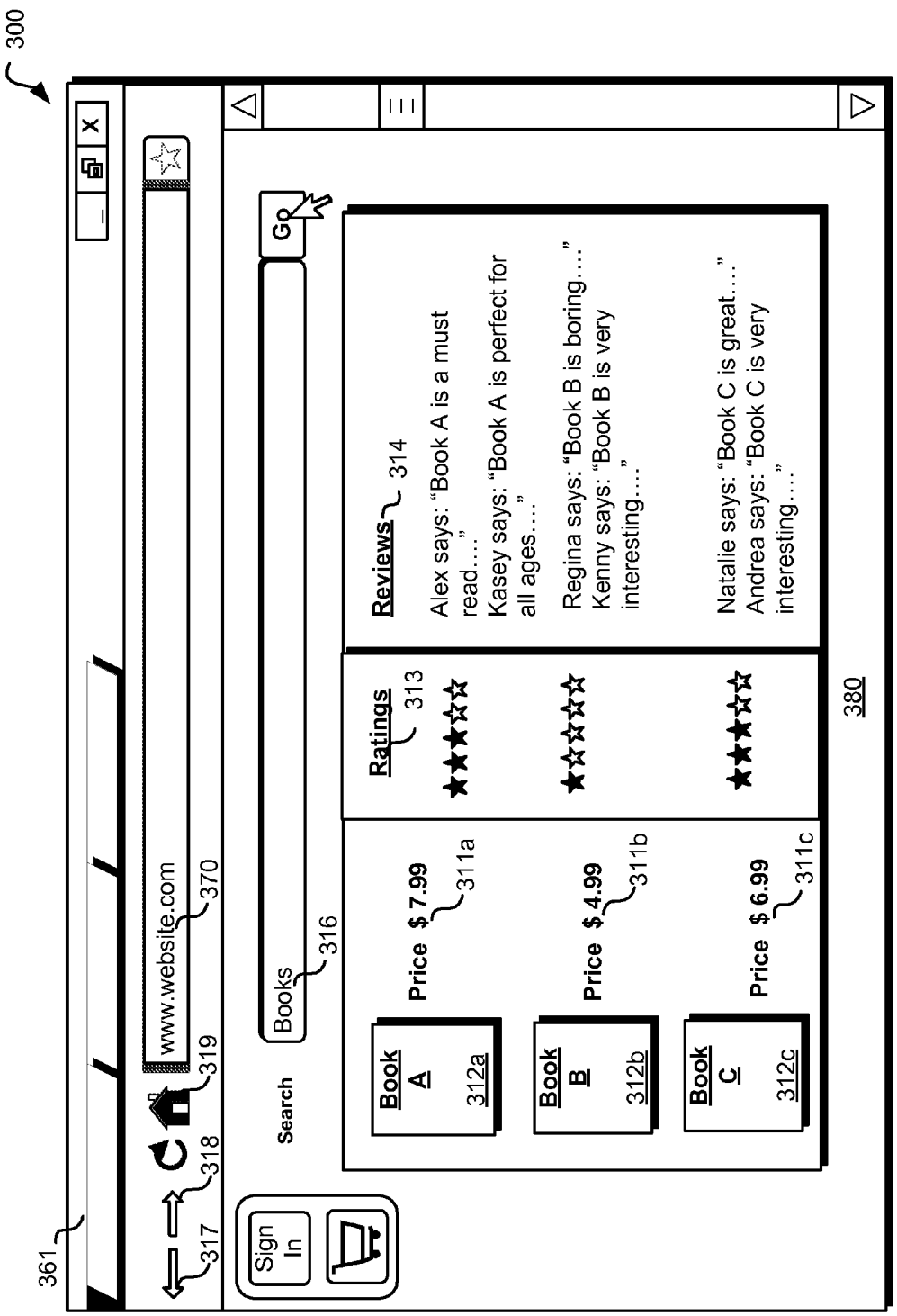
FIG. 3 is an illustrative example of a webpage in accordance with at least one embodiment.

FIG. 3 is an illustrative example 300 of a web application in accordance with at least one example embodiment. In various exemplary embodiments, a web browser 361 is a software application for controlling and accessing information resources over a network, such as the Internet. The web browser could also be a browser to be similarly used to control and access information provided on external servers located in private networks or files in file systems. The web browser 361 can be used to retrieve information resources, commonly referred to as a Uniform Resource Locator (URL), for displaying or rendering requested information to an end-user on a user device. The web browser is generally configured to display requested information directly or configured to render content for display, other web browsers may include or maintain add-ons to enhance application functionality, such as plug-in applications that extend the browser's functionality using downloadable components to support other applications or applets that are not integrated into the browser or are not part of the browser's library.

In various embodiments, the web browser 361 will display and/or render a webpage 380, which is at least one document or page associated with a website that is primarily accessible via a web address, such as a Uniform Resource Locator (URL).

The website's URL may be entered directly into the web browser's address bar 370 in order to request a webpage 380 from the webserver. Mechanisms for utilizing the webpage 380 can include standard tools, proprietary tools, or a combination of the two. Some such exemplary tools include a back button 317 and a forward button 318 enable a user to access previously viewed webpages associated with the website. A home button 319 enables a user to maneuver to the main page of the website. A search bar 316 is provided as a function on example embodiments of a website in order to receive input terms or variables associated with the user's requests.

In the example embodiment 300, the webpage 380 includes a search for the term "books" in the search bar 316. In this example embodiment, the search request entered into the web browser 361 was sent as a request message to a web server, such as the web server 221 in FIG. 2, and the web browser awaits a response message from the web server. Upon receiving a response message from the web server, the web browser can render or display the response as provided by the response message. In the instant example, the web browser displays the requested information for the search term "Books." Three search requests are rendered on the webpage, including Book A 312*a*, Book B 312*b* and Book C 317*c*. Each of the three search requests has a corresponding price associated with the book 311*a*-311*c*, where Book A is priced at $7.99, Book B is priced at $4.99 and Book C is priced at $6.99. The instant example embodiment further illustrates the additional content associated with each of the three search requests, where Books A, B and C have corresponding ratings 313 and reviews 314.

Figure 4:
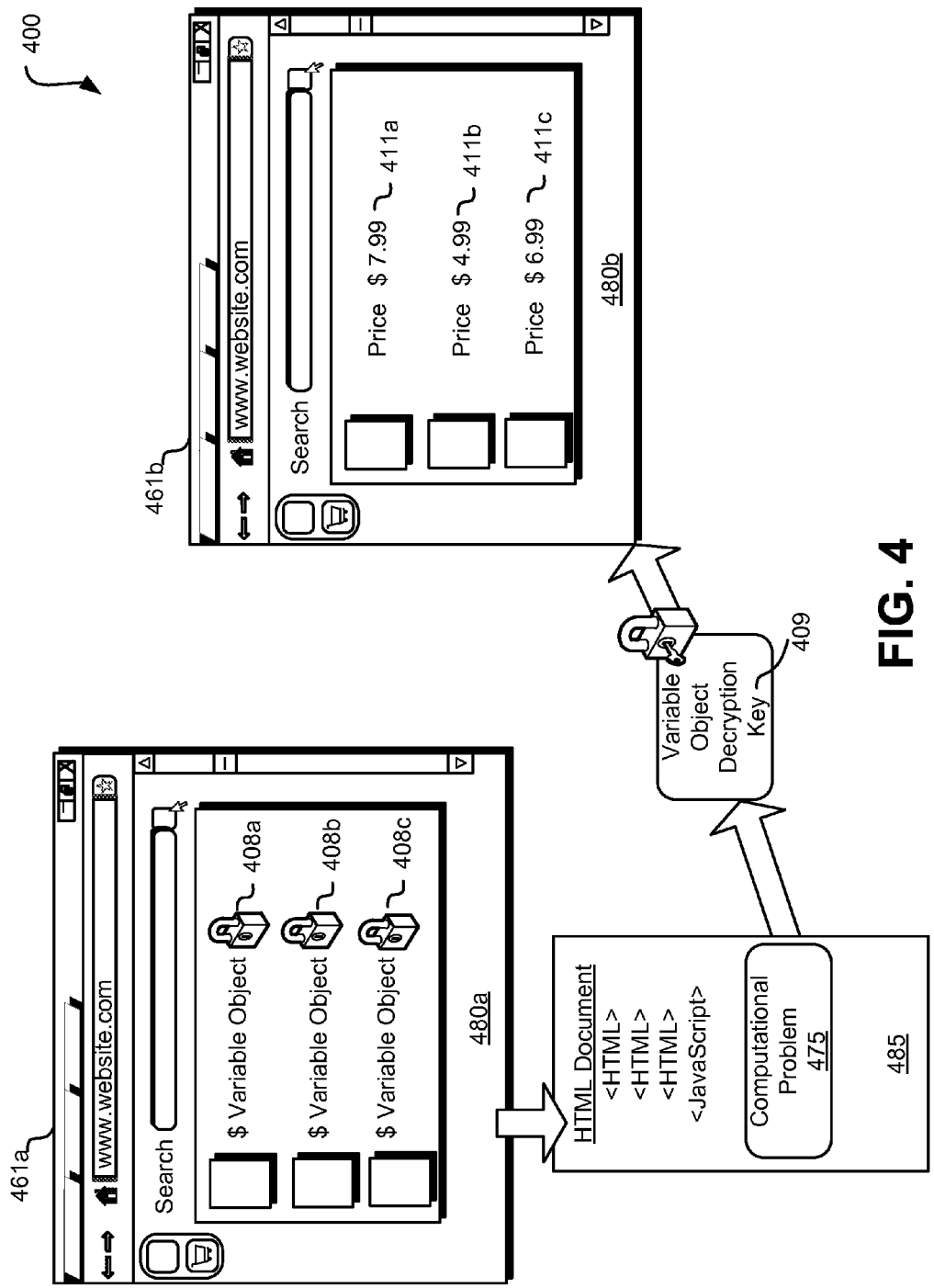
FIG. 4 is an illustrative example of a webpage and variable object(s) associated with the webpage in accordance with at least one embodiment.

FIG. 4 is an illustrative example of a diagram 400 depicting a webpage and variable objects associated with the webpage in accordance with at least one exemplary embodiment.

Web browser 461*a* includes a web page 480*a* that displays the requested content being masked content of variable objects 408*a*-408*c*, where the requested content is shown as encrypted information or content of the variable object (e.g., the prices). Web browser 461*b* includes a web page 480*b* that has completed rendering all objects, such as the unmasked variable objects 411*a*-411*c*.

As the browser downloads the webpage it parses the HTML, which tells the browser whether the browser needs to download other images, scripts, styles, etc., builds the Document Object Model (DOM) and renders the webpage on the display screen of the user device. If the browser encounters a script, such as JavaScript® code, the browser will pause the HTML parsing and execute the script before continuing to build the DOM and render the webpage.

The variable object decryption key 409 is a key, such as a cryptography key, that provides a parameter that determines the output of an algorithm, for example, the key provides the information necessary to transform ciphertext into plaintext during decryption.

Valuable assets such as the prices, ratings, reviews or any other content associated with the webpage that is desired to be hidden or made more difficult for an automated-agent to mine or index the content. In the example embodiment 400, such valuable assets can be encrypted on the server side according to embodiments presented herein and can be provided to the web browser as a variable object, such as variable objects 408*a*-408*c* which are the encrypted plaintext of prices 411*a*-411*c*.

JavaScript® can be used to program functions to be embedded or referenced in HTML pages. As JavaScript® is configured to run locally on a user's browser, the browser can execute the JavaScript® code to render or display the requested data. In alternative example embodiments, the web browser is configured to render the webpage content according to the HTML instructions of the webpage or according to a JavaScript® script embedded within the HTML, or called or referenced as a file within the HTML of the webpage. Other such scripting languages and/or calls currently known or hereinafter developed can similarly be used or interchanged in accordance with embodiments presented herein.

Alternative example embodiments include web browsers consisting of split architecture where some portion of the processing is performed on the web server and some portion of the processing is performed locally on a device running the web browser. The client browser is generally configured to complete the entirety of the processing at the web browser with the option to turn off any or all server-side processing.

Figure 5:
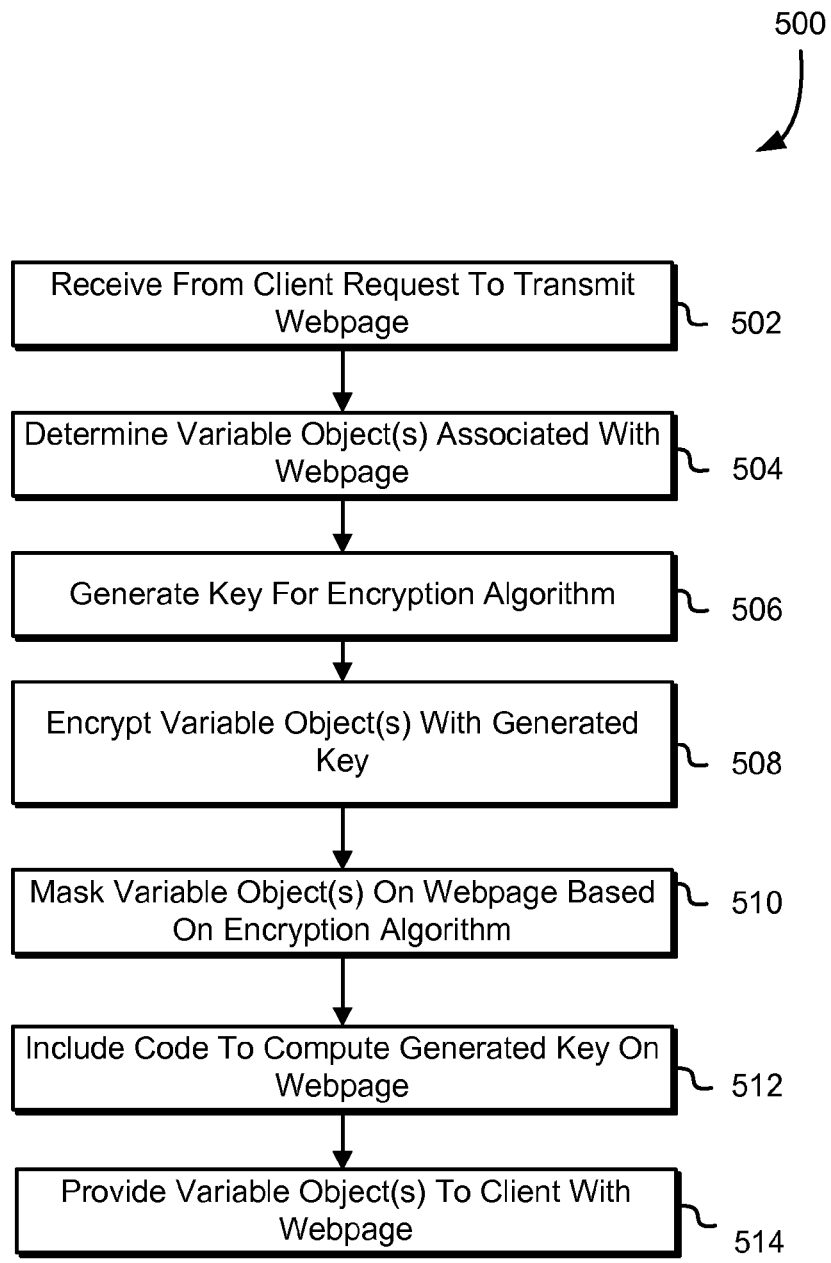
FIG. 5 is an illustrative example of a process for providing variable object(s) on a webpage in accordance with at least one embodiment.

FIG. 5 is an illustrative example of a process 500 for providing variable objects on a webpage in accordance with at least one embodiment. The process 500 may be performed by any suitable system, such as by the web server 221 described above in connection with FIG. 2 and/or an appropriate component of a system associated therewith, such as by a web service operating to provide the connection and interface with the user. Returning to FIG. 5, an embodiment of the process 500 includes receiving 502 a request from a client to transmit a webpage. Where the request from the client could be an automated request transmitted from an automated-agent, a request submitted by a human-user via a browsing application or a combination or intermix of automated and human requests. Returning to FIG. 5, the process 500 continues by determining 504 variable objects associated with a webpage. Such variable objects could include any such content that is desired or required to be temporarily hidden from view or otherwise veiled such that the content is not immediately freely accessible to a client (e.g., because successful completion of a computational task is required). Returning to FIG. 5, an embodiment of the process 500 includes generating 506 a unique key for an encryption algorithm. Further example embodiments afford for the key to be a non-unique key. Alternative example embodiments could include a server receiving a pre-generated key from a third-party source.

Returning to FIG. 5, an embodiment of the process 500 includes encrypting 508 the variable objects with the generated key. Various example embodiments include receiving a pre-encrypted variable object, or one of multiple variable objects. The pre-encrypted variable objects may or may not be received from the same or a different third-party source from which a pre-generated key was received. Returning to FIG. 5, an embodiment of the process 500 includes masking 510 the variable objects on the webpage based on the encryption algorithm. The variable objects can be embedded in a secret field such that the content or value of the variable object cannot be seen; for example, the value could be a modern hash or a long stream of integers that is different from the value of the content. Returning to FIG. 5, an embodiment of the process 500 includes incorporating 512 the code used for computing the generated key on the webpage. Alternative embodiments of the process may include providing the script to be parsed in order to decrypt the generated key on the webpage for use in decrypting the encryption algorithm. Returning to FIG. 5, an embodiment of the process 500 includes unmasking 514 the variable objects on the webpage after successful decryption. Alternative embodiments of the process may include providing the variable object to the client for use in unmasking the variable object on the webpage after the successful decryption.

Figure 6:
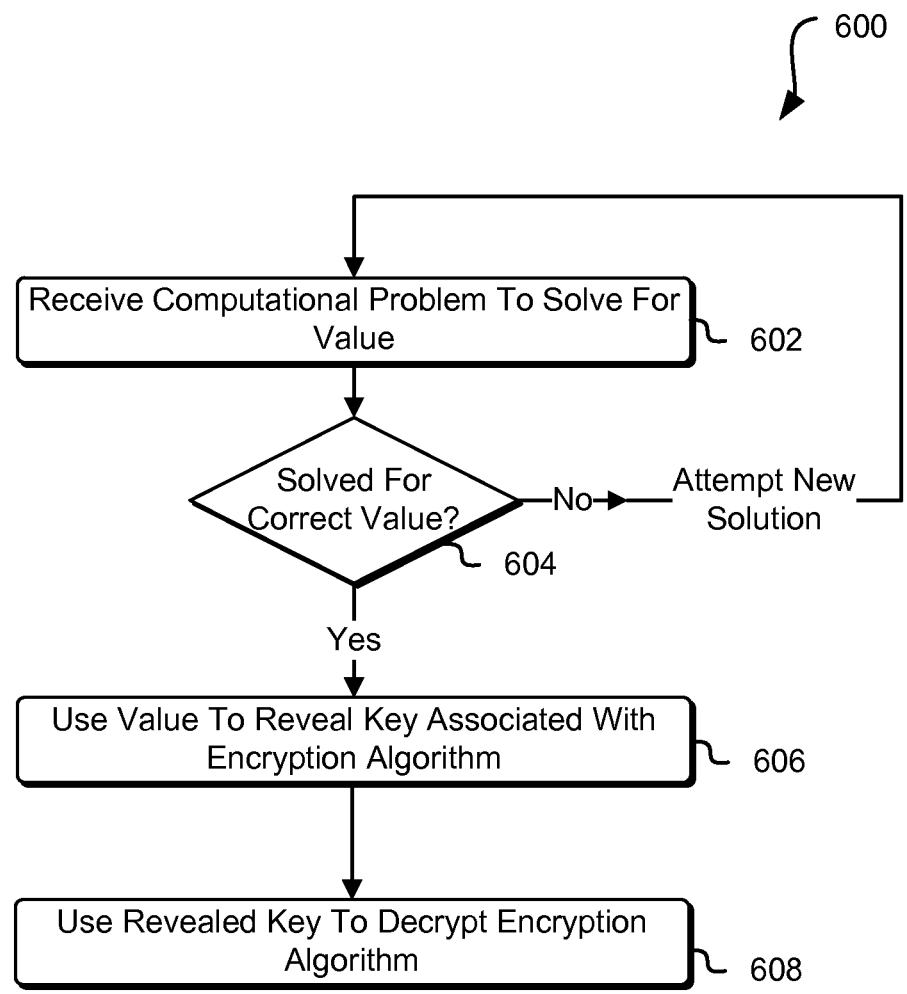
FIG. 6 is an illustrative example of a process for masking variable object(s) after completed decryption in accordance with at least one embodiment.

FIG. 6 is an illustrative example of a process 600 for using a revealed key to decrypt an encryption algorithm in accordance with at least one embodiment. The process 600 may be performed by any suitable system, such as by the web client as described in connection with FIG. 1 and/or appropriate component thereof. Returning to FIG. 6, in an embodiment of the process 600, includes receiving 602 a computational problem to be solved for a value, where the problem is received from a web server hosting a website from which content is being requested by the client, the computational problem being acquired in any suitable manner. For example, referring to FIG. 4, the variable object decryption key 409 may be embedded in the HTML script of the webpage being downloaded such that when the client would parse the HTML document, the computational problem or algorithm would have to be solved in order to receive the variable object decryption. As illustrated in FIG. 6, once the computational problem has been received, the client must solve 604 the problem for a correct result; this process to determine the correct value must be repeated until the correct solution is found. As illustrated in FIG. 6, the client, upon solving for the correct value, can use 606 the value to reveal the variable object decryption key associated with the variable objects having been concealed on the webpage by the server. For example, referring to FIG. 4, the server would provide the variable object decryption key within the HTML document 485 to be accessed after the computational problem 475 is correctly solved. Returning to FIG. 6, the client, upon revealing the Key, uses 608 the key to decrypt the encryption algorithm thereby allowing the client to continue rendering the webpage and displaying the requested unencrypted content and data.

Figure 7:
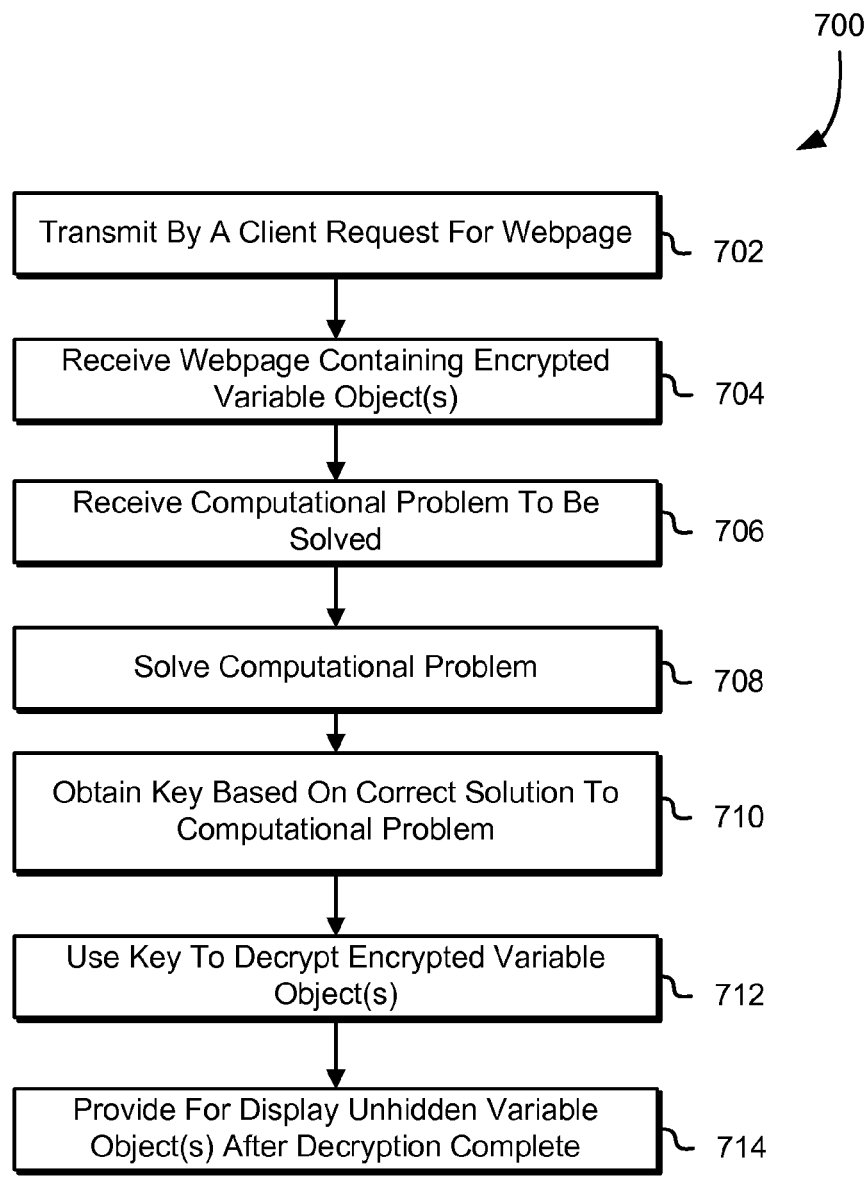
FIG. 7 is an illustrative example of a process for providing unmasking variable object(s) for display after completed decryption in accordance with at least one embodiment.

FIG. 7 is an illustrative example of a process 700 for providing unhidden variable objects for display after completed decryption in accordance with at least one exemplary embodiment. The process 700 may be performed by any suitable system, such as by the web browser 261a or web crawler 261b as described in connection with FIG. 2 and/or appropriate component thereof. Returning to FIG. 7, in an embodiment, the process 700 includes transmitting 702 a request for a webpage from a client to a server via a network, such as the Internet. The client will receive 704 a webpage containing encrypted variable objects such that the content of the webpage cannot be easily scraped or indexed due to the valuable data being necessary to decrypt before enabling display of same. In various embodiments, the process 700 further includes the client receiving 706 an algorithm or cipher that must be computed 708 prior to the client rendering the webpage with the requested content in unencrypted form. Example embodiments of a computational problem are illustrated in detail in FIG. 9 and described in the corresponding written description. Returning to FIG. 7, the process 700 continues by obtaining 710, by the client, the decryption key associated with the encrypted content and enables the client to use 712 the revealed key to decrypt the encrypted content. The encrypted content may be a single element or object included in the webpage, such as the price objects 411a-411c as described in connection with FIG. 4, or the encrypted content may include multiple elements, such as the ratings 313 and reviews 314 as described in connection with FIG. 3. Returning to FIG. 7, the process 700 continues by enabling the client to provide 714 for display the unhidden variable objects after the decryption key is revealed and used to decrypt the encryption algorithm, thereby allowing the client to continue parsing the HTML document and render the content and associated information for display on a user device.

Figure 8:
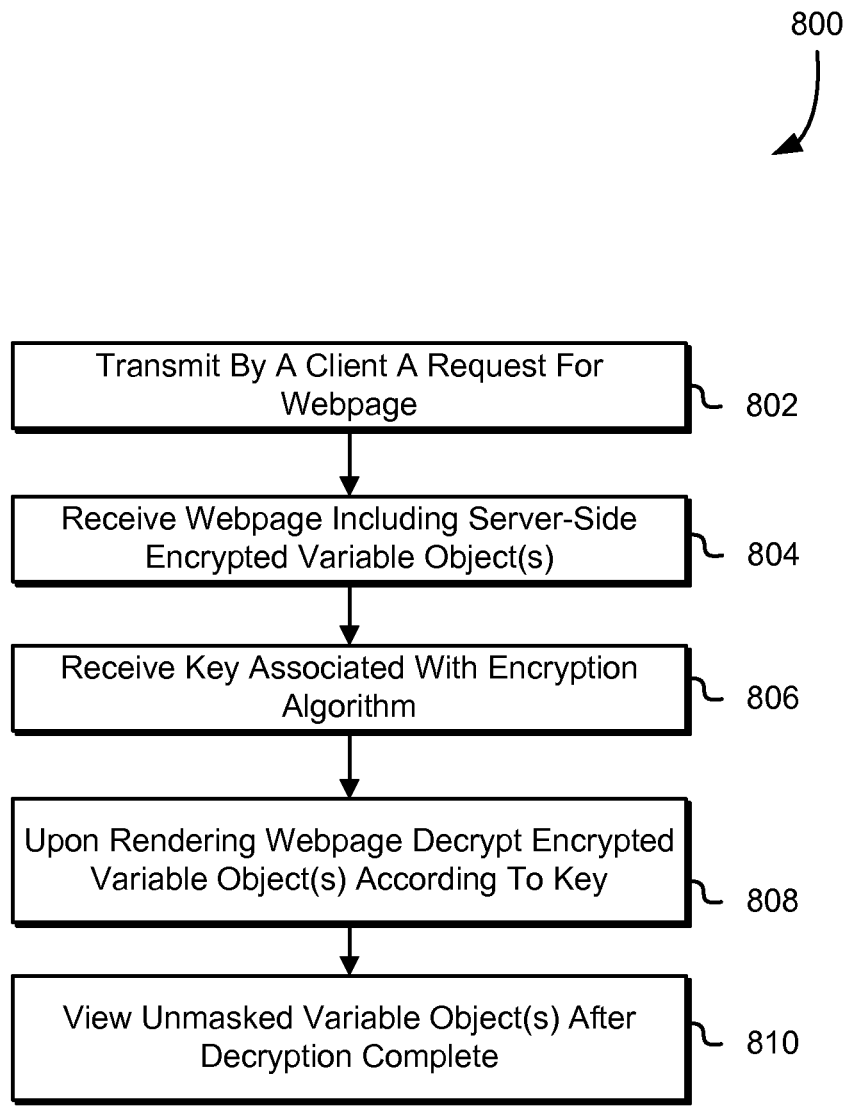
FIG. 8 is an illustrative example of a process for using a revealed key to decrypt an encryption algorithm in accordance with at least one embodiment.

FIG. 8 is an illustrative example of a process 800 for unmasking variable objects after completed decryption in accordance with at least one embodiment. The process 800 may be performed by any suitable system, such as by the web browser 261a or web crawler 261b as described in connection with FIG. 2 and/or appropriate component thereof. Returning to FIG. 8, in an embodiment, the process 800 includes transmitting 802, by a client, a request for a webpage as requested by a user. For example, the request may be submitted by a client 160 using a request message 125a via the Internet 150 as described in connection with FIG. 1. Returning to FIG. 8, the process 800 continues by receiving 804, at the client, a webpage including server-side encrypted content. In alternative example embodiments, a server could refuse to provide the requested content to the client and, alternatively, respond with an HTTP response status code, such as a request received-continuing process code, a redirection code or the like. Returning to FIG. 8, the process 800 includes receiving 806, at the client via the webpage, a key associated with an encryption algorithm used by the server to encrypt the plaintext content of the webpage. In example embodiments, the key can be provided as part of the HTML document, including, if necessary, additional scripting embedded therein, such that the key is provided to the client upon downloading of the webpage from the server. The process 800 continues by enabling the client, upon rendering the webpage, to decrypt 808 the encrypted variable object according to the provided key. In alternative example embodiments, the client may receive the key embedded in the HTML document without the need to solve an algorithm in circumstances where the request from the client is transmitted from a computer or computer system being associated, directly or indirectly, with the server, such that the server can bypass or turn off the requirement that an algorithm be computed before receiving a key for the decryption. In some such alternative example embodiments, the content may not be encrypted whatsoever according to the association of server and client and/or desires of the server administrator or owner. Returning to FIG. 8, the process 800 continues by enabling a client to view the unhidden variable object upon successful decryption of the content, which can then be displayed to an end user.

In alternative example embodiments, where the client is a web crawler operated by an automated-agent, such as the client 261b as illustrated and described in connection with FIG. 2, the client could be directed to or opt to interact directly with an application programming interface (API) instead of interacting with a system hosting the website. In some such example embodiments, the server would forgo the decryption process altogether or simply provide the decryption key without the need for solving a computational problem, such that the automated-agent can receive the content in a more efficient manner. In alternative example embodiments, the automated-agent could receive the unencrypted content in the form of structured data.

FIG. 9 is an illustrative example of a computational database 900 in accordance with at least one embodiment. Requiring a cryptographic key to determine the functional output of a cryptographic algorithm or cipher; without the key, the algorithm would produce no useful result. Information or content is encrypted or encoded such that the content is masked from unauthorized users. Initially, the content as plaintext is encrypted using an encryption key to specify how the content should be encoded. The plaintext can be electronic representations of text, such as webpage or document content or could also represent videos, images, sound or other information that is intended or desired to be concealed. Content may be pre-encrypted and/or pre-generated as well as being encrypted or generated in response to a request. Such pre-encryption may be the result of receiving data content from a third-party server operably interconnected to the web server providing the website to the client.

Various exemplary embodiments can encrypt desired content on the server-side and generate a unique key per webpage that is requested and rendered. The unique key is then used to encrypt the data, and the algorithmic choice for deciphering the unique key can be chosen based on the magnitude of cost to the server to encrypt the content versus the magnitude of cost to the client to decrypt the content. The algorithmic choice can be generated dynamically in response to a request for content. For example, based on the amount of content requested, where when more content is requested an algorithm with a high magnitude of computational resources requirements will be embedded in the HTML of the web document thereby causing the client to perform additional work. In some embodiments, the server administrator or other authoritative party may update or tune the computational problem being provided to the client such that the problem is made more difficult as technology improves or for the purpose of making the process more computationally expensive or time consuming for automated-agents.

Example embodiments of algorithms to be executed by a client in order to decrypt variable objects encrypted on the server-side, or provided in a pre-encoded fashion, could include a hash function problem 931, which requires a keyed-hash message authentication code (HMAC) requires calculating a message authentication code (MAC) using a cryptographic hash function and a secret cryptographic key. One technical advantage achieved by a problem such as the problem 931 is that the server can generate the problem with minimal computational resources relative to the resources required by the client (statistically speaking) to solve the problem. For example, the correct value for "Rand" can be generated as a random number, a number from a sequence or otherwise with minimal computational resources. However, because a hash function is effectively a one-way function, without prior access to the value for "Rand," a client may, on average, perform a large number of operations before a correct value for "Rand" is found.

Alternative example embodiments could include a public-key cryptography problem 932 such as RSA, which is an algorithm for public-key cryptography that involves the factoring of large integers. Examples of RSA can include the known product of two large prime numbers, along with an auxiliary value as the public key for the two prime numbers. As with the problem 931, the problem 932 provides technical advantages due to the difference in computational resources needed to generate a private key relative to those required, on average, to determine a private key given a public key.

Alternative example embodiments could include a particular type of mathematical system making use of exponents that is often used with cryptography. Such a discrete logarithm problem 933 is known as a difficult problem when the numbers involved are very large causing expensive computational efforts. However, as with the problems 931 and 932, generation of the problem 933 is, in terms of required computational resources, computationally much easier to generate than to solve. Alternative computational problems may include problems that are computationally inexpensive to use for encrypting data on a server-side device and magnitudes more computationally expensive for decrypting the data on a client-side device. For example, a discrete logarithm problem using a finite field defined by the algebraic properties of an elliptic curve may be used.

Alternative computational tasks may include a problem having been generated based on a first algorithm with a first time complexity and a second algorithm with a second time complexity that is asymptotically larger than the first. For example, there is some N for which T2 is greater than T1 for all n greater than N. T2 is the time complexity of the second algorithm and T1 is the time complexity of the first algorithm, both measured on either an average-case basis or worst-case basis. In some embodiments, the limit of $T2(n)/T1(n)$ approaches infinity as n approaches infinity.

In some embodiments, a brute-force attack may be required in order to decrypt the key. For example, where the response to the request message provides a portion of the key or a partial key and requires the client to use a brute-force attack in order to decrypt the key. Further, use of asymmetric cryptography could be employed that does not require brute-force attack for encryption, but requires a client to compute n computations, where n is a tunable number, in order to decrypt the key. Other embodiments may provide information related to the key, such as the number of bytes for the key, a prefix and/or additional properties, which then requires the client to solve for the key in totality based on the provided information.

Alternative example embodiments may include different encryption schemes, such as public-key encryption or private-key encryption, or other currently known or hereinafter developed methods of content encryption can be implemented according to exemplary embodiments presented herein. Similarly, different cryptographic key types may be used as desired. Alternative computational mechanisms, algorithms and cryptographic methods herein known or hereinafter developed may be used to encrypt or conceal the content requested by the user.

Further example embodiments could include a computational task provided to an automated-agent can include providing an algorithm that is non-polynomial. For example, a set or property of problems for which no polynomial-time algorithm is known or for which no polynomial-time algorithm exists, such as problems that are provably difficult and problems that are provably unsolvable.

Further example embodiments can include an algorithm to create a random salt per page, for example, a unique data element that can be placed in the middle of a document that requires computation for every single webpage that is requested and loaded.

In addition, while the present disclosure uses various problems that require more CPU cycles, on average, to solve than to generate, which are provided for the purpose of illustration; problems may be created to tax other types of computational resources, such as memory. For instance, a script with a webpage may encode multiple recursive uses of a function, where the number or recursions is configured such that the memory resources needed to solve the problem would not be problematic for a typical client, but would be problematic for a robot that may be accessing many more webpages in a given time period. As an explicit example, the $N^{th}$ Fibonacci number may be required to encrypt a price on a webpage. A script may use a recursive function for determining the $N^{th}$ Fibonacci number. A value for N (a positive integer) may be selected based on assumptions of memory for clients so that, for clients associated with human operators, the memory taken to determine the number will not cause a problem, but for a robot accessing multiple pages in a short time, memory may cause performance issues. A script may further include code for prime factorization algorithms, such as trial division, wheel factorization, Pollard's rho algorithm, an algebraic-group factorization algorithm (such as Pollard's p−1 algorithm, Williams' p+1 algorithms, and Lenstra's elliptic curve factorization algorithm), Fermat's factorization method, Euler's factorization method, a special number field sieve, Dixon's algorithm, continued fraction factorization, quadratic sieve, rational sieve, general number field sieve, Shanks' square forms factorization, the Schnorr-Seysen-Lenstra algorithm, Shor's algorithm and the like.

Example embodiments can include each price or variable object being encrypted using a different key and/or a single key may be used to decrypt all content on the requested webpage. Alternative example embodiments may use a variation of a single key to decrypt some objects on the webpage and a different variation or wholly different key may be used to decrypt other objects on the same or different webpage. Different keys and types of encoding may be implemented for encrypting content on the same or different webpages. For example, symmetric cryptography and asymmetric cryptography can be used in order to encrypt the content.

Unless otherwise clear from context, when stated that a website has certain characteristics or performs certain operations, it is intended to refer to the underlying system that serves the website and not necessarily the collection of documents and other resources that make up the website. The system hosting the website may include multiple different devices and servers, such as a web server, an application server, a database server, a storage server and the like.

Figure 10:
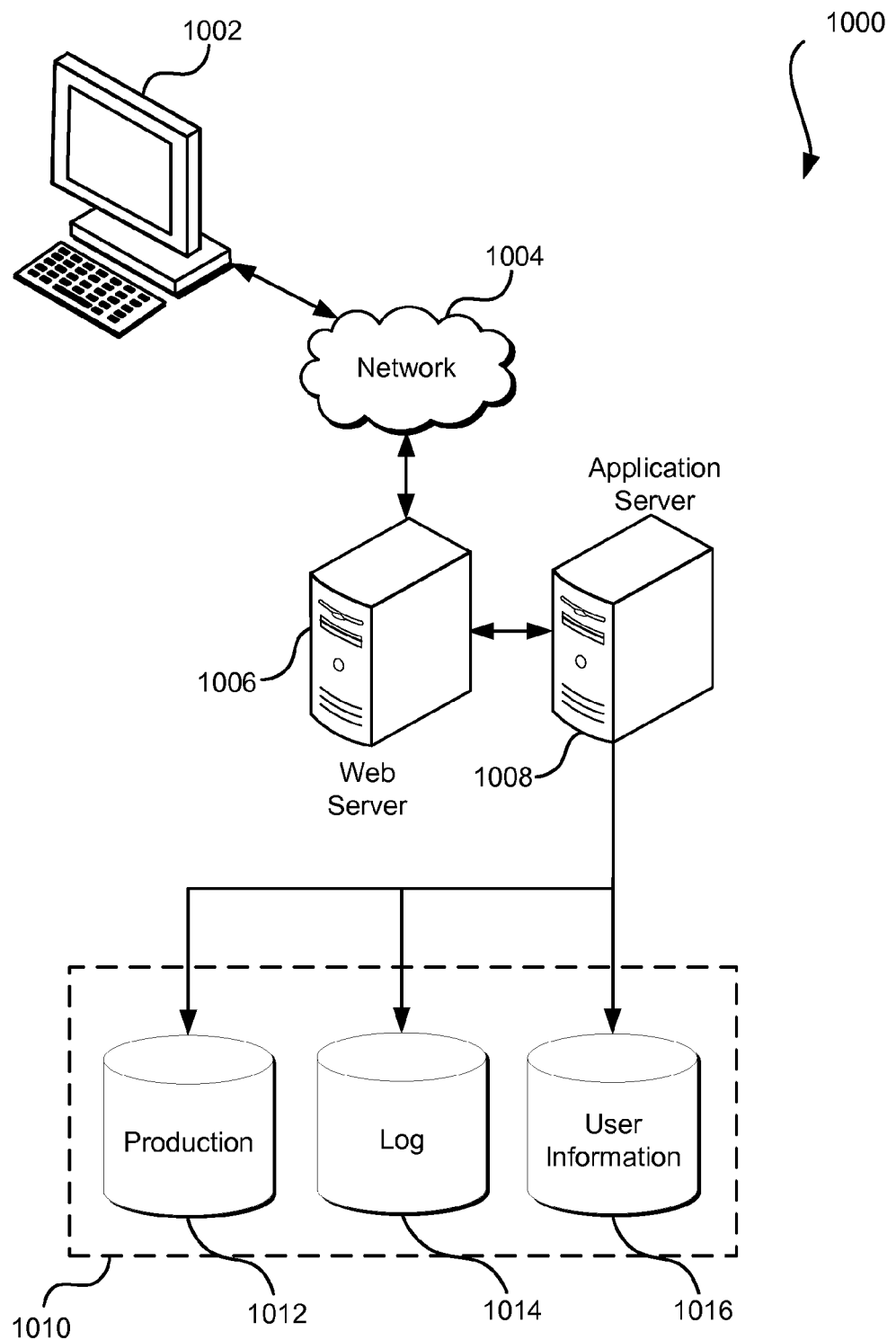
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein the term "data store" refers to any device or combination of devices configured to store, access and retrieve data, which may include any combination and number of data servers, databases, data storage devices and data storage media, in any standard, distributed or clustered environment. The application server can include any appropriate hardware and software for integrating with the data store as needed to execute aspects of one or more applications for the client device, handling some (even a majority) of the data access and business logic for an application. The application server may provide access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices that may form a distributed system.

The data store 1010 can include several separate data tables, databases or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and configured to support a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members used in the above conjunctive phrase, "at least one of A, B, and C" and "at least one of A, B and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C to each be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for increasing computational cost for automated-agents, comprising:
    under the control of one or more computer systems configured with executable instructions, receiving, to a server from a client device, a request for a webpage;
    generating encrypted content by encrypting content using a key;
    obtaining unencrypted content;
    generating executable instructions that, when executed by the client device cause the client device to perform an algorithm for calculating a decryption key, use the calculated decryption key to decrypt the encrypted content, and provide decrypted encrypted content for display with the unencrypted content, wherein generating the executable instructions statistically requires fewer computations than performing the algorithm;
    generating the webpage to include the encrypted content, the unencrypted content, and the executable instructions; and
    in response to the request, providing the generated webpage to the client device.

2. The computer-implemented method of claim 1, wherein the algorithm includes factoring a number into prime factors and using at least one of the prime factors to decrypt the content.

3. The computer-implemented method of claim 1, further comprising providing an application programming interface through which the encrypted content is available in unencrypted form.

4. The computer-implemented method of claim 1, wherein the webpage comprises information from an electronic catalog of items offered in an electronic marketplace and the encrypted content includes, in encrypted form, information about an item from the electronic catalog.

5. The computer-implemented method of claim 4, wherein the information about the item includes a price of the item.

6. The computer-implemented method of claim 1, wherein the executable instructions are browser executable instructions.

7. The computer-implemented method of claim 1, wherein the algorithm is encoded in a scripting language.

8. A non-transitory computer-readable storage medium having stored thereon instructions that, when executed by one or more processors of a computer system, cause the computer system to:
   receive a request for content from a requestor;
   generate encrypted content by encrypting content using a key;
   generate executable instructions to be executed by the requestor, the executable instructions including a computational task to be completed by the requestor such that proof of completion of the computational task is required to obtain the encrypted content in plaintext form, wherein generating the executable instructions statistically requires fewer computations than completing the computational task;
   as a result of receiving the request, enable the computer system to transmit a webpage in response, the webpage including the encrypted content and the executable instructions; and
   in response to the request, provide the webpage to the requestor.

9. The non-transitory computer-readable storage medium of claim 8, wherein the instructions that cause the computer system to transmit the response further include instructions that cause the computer system to transmit unencrypted content associated with the encrypted content.

10. The non-transitory computer-readable storage medium of claim 8, wherein completing the computational task includes successful calculation of a decryption key.

11. The non-transitory computer-readable storage medium of claim 10, wherein the decryption key is usable to decrypt the encrypt content to receive unencrypted content.

12. The non-transitory computer-readable storage medium of claim 11, wherein the unencrypted content includes a price of an item.

13. The non-transitory computer-readable storage medium of claim 11, wherein complexity of the computational task is modified based on an amount of content requested by the requestor.

14. The non-transitory computer-readable storage medium of claim 11, wherein the computational task is generated as a result of receiving the received request.

15. The non-transitory computer-readable storage medium of claim 8, wherein the webpage includes a meta tag to provide a directive, to the requestor, to interact with an application programming interface configured to provide the encrypted content in plaintext form.

16. A system comprising:
   a server configured to:
      receive a request for content from a requestor;
      generate encrypted content by encrypting content using a key;
      generate executable instructions to be executed by the requestor, the executable instructions including a computational task to be completed by the requestor such that proof of completion of the computational task is required to obtain the encrypted content in plaintext form, wherein generating the executable instructions statistically requires fewer computations than completing the computational task;
      as a result of receiving the request, enable the computer system to transmit a webpage in response, the webpage including the encrypted content and the executable instructions; and
      in response to the request, provide the webpage to the requestor.

17. The system of claim 16, wherein the instructions that cause the computer system to transmit the response further include instructions that cause the computer system to transmit unencrypted content associated with the encrypted content.

18. The system of claim 16, wherein completing the computational task includes successful calculation of a decryption key.

19. The system of claim 18, wherein the decryption key is usable to decrypt the encrypted content to receive unencrypted content.

20. The system of claim 19, wherein the unencrypted content includes a price of an item.

21. The system of claim 19, wherein complexity of the computational task is modified based on an amount of content requested by the requestor.

22. The system of claim 19, wherein the computational task is generated as a result of receiving the received request.

23. The system of claim 16, wherein the webpage includes a meta tag to provide a directive, to the requestor, to interact with an application programming interface configured to provide the encrypted content in plaintext form.

* * * * *